(12) United States Patent
Gupta et al.

(10) Patent No.: US 10,449,899 B2
(45) Date of Patent: Oct. 22, 2019

(54) VEHICLE VISION SYSTEM WITH ROAD LINE SENSING ALGORITHM AND LANE DEPARTURE WARNING

(71) Applicant: MAGNA ELECTRONICS INC., Auburn Hills, MI (US)

(72) Inventors: Nikhil Gupta, Brampton (CA); Eduardo R. Corral-Soto, Toronto (CA)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 289 days.

(21) Appl. No.: 15/147,301

(22) Filed: May 5, 2016

(65) Prior Publication Data

US 2016/0325682 A1    Nov. 10, 2016

Related U.S. Application Data

(60) Provisional application No. 62/158,837, filed on May 8, 2015.

(51) Int. Cl.
| | | |
|---|---|---|
| *B60R 1/00* | (2006.01) | |
| *G06K 9/00* | (2006.01) | |
| *B60Q 9/00* | (2006.01) | |
| *G06K 9/20* | (2006.01) | |

(52) U.S. Cl.
CPC .............. *B60R 1/00* (2013.01); *B60Q 9/00* (2013.01); *G06K 9/00798* (2013.01); *G06K 9/209* (2013.01); *B60R 2300/607* (2013.01); *B60R 2300/804* (2013.01)

(58) Field of Classification Search
USPC ........................................................ 348/148
See application file for complete search history.

(56) References Cited

U.S. PATENT DOCUMENTS

| | | |
|---|---|---|
| 4,600,913 A | 7/1986 | Caine |
| 4,907,870 A | 3/1990 | Brucker |
| 4,971,430 A | 11/1990 | Lynas |
| 5,097,362 A | 3/1992 | Lynas |
| 5,177,685 A | 1/1993 | Davis et al. |
| 5,189,561 A | 2/1993 | Hong |
| 5,424,952 A | 6/1995 | Asayama |
| 5,500,766 A | 3/1996 | Stonecypher |
| 5,521,633 A | 5/1996 | Nakajima et al. |

(Continued)

*Primary Examiner* — Chikaodili E Anyikire
(74) *Attorney, Agent, or Firm* — Honigman LLP

(57) ABSTRACT

A vehicle vision system includes a plurality of cameras disposed at a vehicle and having respective fields of view exterior of the vehicle. An image processor is operable, responsive to image processing of captured image data, to synthesize captured image data to generate a reduced distortion bird's-eye view image of a region exterior and near the vehicle and encompassed by the fields of view of the cameras. A display displays the bird's-eye view image for viewing by a driver of the vehicle. The image processor processes synthesized captured image data using a lane marker sensing algorithm that utilizes recursive temporal stabilization to determine lane markings in the field of view of at least the rear camera. The system determines when the vehicle is departing from its being-traveled lane and, responsive to determination that the vehicle is departing from its being-traveled lane, generates an alert to the driver of the vehicle.

16 Claims, 2 Drawing Sheets

(56) References Cited

U.S. PATENT DOCUMENTS

| | | |
|---|---|---|
| 5,550,677 A | 8/1996 | Schofield et al. |
| 5,581,464 A | 12/1996 | Woll et al. |
| 5,642,299 A | 6/1997 | Hardin et al. |
| 5,670,935 A | 9/1997 | Schofield et al. |
| 5,790,403 A | 8/1998 | Nakayama |
| 5,796,094 A | 8/1998 | Schofield et al. |
| 5,877,897 A | 3/1999 | Schofield et al. |
| 5,884,212 A | 3/1999 | Lion |
| 5,949,331 A | 9/1999 | Schofield et al. |
| 6,185,492 B1 | 2/2001 | Kagawa |
| 6,285,393 B1 | 9/2001 | Schimoura et al. |
| 6,317,057 B1 | 11/2001 | Lee |
| 6,353,392 B1 | 3/2002 | Schofield et al. |
| 6,396,397 B1 | 5/2002 | Bos et al. |
| 6,411,204 B1 | 6/2002 | Bloomfield et al. |
| 6,420,975 B1 | 7/2002 | DeLine et al. |
| 6,433,676 B2 | 8/2002 | DeLine et al. |
| 6,485,155 B1 | 11/2002 | Duroux et al. |
| 6,487,501 B1 | 11/2002 | Jeon |
| 6,594,583 B2 | 7/2003 | Ogura et al. |
| 6,823,241 B2 | 11/2004 | Shirato et al. |
| 7,038,577 B2 | 5/2006 | Pawlicki et al. |
| 7,400,236 B2 | 7/2008 | Kade et al. |
| 7,510,038 B2 | 3/2009 | Kaufmann et al. |
| 7,526,103 B2 | 4/2009 | Schofield et al. |
| 7,532,981 B2 | 5/2009 | Kataoka |
| 7,557,732 B2 | 7/2009 | Kataoka |
| 7,643,911 B2 * | 1/2010 | Ishihara .................... B60R 1/00 701/1 |
| 7,711,464 B2 | 5/2010 | Kaufmann |
| 7,720,580 B2 | 5/2010 | Higgins-Luthman |
| 7,914,187 B2 | 3/2011 | Higgins-Luthman et al. |
| 8,164,628 B2 | 4/2012 | Stein et al. |
| 8,311,283 B2 * | 11/2012 | Wu .................... G06K 9/00798 348/148 |
| 8,930,081 B2 | 1/2015 | Bolourchi |
| 9,180,908 B2 | 11/2015 | Van Dan Elzen et al. |
| 9,205,776 B2 | 12/2015 | Turk |
| 9,340,227 B2 | 5/2016 | Bajpai |
| 9,946,940 B2 | 4/2018 | Gupta et al. |
| 2002/0041229 A1 | 4/2002 | Satoh et al. |
| 2002/0169531 A1 | 11/2002 | Kawazoe et al. |
| 2002/0188392 A1 | 12/2002 | Breed et al. |
| 2003/0052773 A1 | 3/2003 | Sjonell |
| 2003/0156015 A1 | 8/2003 | Winner et al. |
| 2004/0098197 A1 | 5/2004 | Matsumoto et al. |
| 2004/0107035 A1 | 6/2004 | Tange et al. |
| 2004/0183663 A1 | 9/2004 | Shimakage |
| 2004/0230375 A1 | 11/2004 | Matsumoto et al. |
| 2004/0252020 A1 | 12/2004 | Matsumoto et al. |
| 2004/0262063 A1 | 12/2004 | Kaufmann et al. |
| 2005/0015203 A1 | 1/2005 | Nishira |
| 2005/0107931 A1 | 5/2005 | Shimakage et al. |
| 2005/0125125 A1 | 6/2005 | Matsumoto et al. |
| 2005/0125153 A1 | 6/2005 | Matsumoto et al. |
| 2005/0179527 A1 | 8/2005 | Schofield |
| 2005/0273234 A1 | 12/2005 | Rattapon et al. |
| 2005/0273261 A1 | 12/2005 | Niwa et al. |
| 2005/0278096 A1 | 12/2005 | Iwazaki et al. |
| 2006/0030987 A1 | 2/2006 | Akita |
| 2006/0047388 A1 | 3/2006 | Oka et al. |
| 2006/0164514 A1 | 7/2006 | Muramatsu et al. |
| 2007/0091173 A1 | 4/2007 | Kade et al. |
| 2007/0100551 A1 | 5/2007 | Ishikura |
| 2007/0225914 A1 | 9/2007 | Kawazoe et al. |
| 2007/0233343 A1 | 10/2007 | Saito et al. |
| 2007/0233386 A1 | 10/2007 | Saito et al. |
| 2008/0061952 A1 | 3/2008 | Maass |
| 2008/0080740 A1 | 4/2008 | Kaufmann |
| 2008/0183342 A1 | 7/2008 | Kaufmann et al. |
| 2008/0278349 A1 | 11/2008 | Kataoka et al. |
| 2009/0024279 A1 | 1/2009 | Takeda et al. |
| 2009/0085913 A1 | 4/2009 | Sakamoto et al. |
| 2009/0132125 A1 | 5/2009 | Yonezawa |
| 2009/0153360 A1 | 6/2009 | Kim |
| 2009/0245582 A1 * | 10/2009 | Sakamoto .......... G06K 9/00798 382/104 |
| 2009/0284360 A1 | 11/2009 | Litkouhi |
| 2010/0114431 A1 | 5/2010 | Switkes et al. |
| 2010/0121532 A1 | 5/2010 | Urai et al. |
| 2010/0145575 A1 | 6/2010 | Switkes et al. |
| 2010/0182139 A1 | 7/2010 | Chen et al. |
| 2010/0189306 A1 | 7/2010 | Kageyama |
| 2010/0195908 A1 | 8/2010 | Bechtel |
| 2010/0228420 A1 | 9/2010 | Lee |
| 2011/0090339 A1 * | 4/2011 | Higgins-Luthman ..... B60R 1/00 348/148 |
| 2011/0231062 A1 | 9/2011 | Kim |
| 2011/0231095 A1 | 9/2011 | Nakada et al. |
| 2012/0050074 A1 | 3/2012 | Bechtel |
| 2012/0050489 A1 * | 3/2012 | Gupta ................ G06K 9/00798 348/46 |
| 2012/0320210 A1 | 12/2012 | Imai et al. |
| 2013/0093888 A1 | 4/2013 | Kim |
| 2013/0144521 A1 | 6/2013 | Mathieu |
| 2013/0147956 A1 * | 6/2013 | Ehlgen .................. H04N 7/188 348/148 |
| 2013/0173115 A1 | 7/2013 | Gunia et al. |
| 2013/0253767 A1 | 9/2013 | Lee et al. |
| 2013/0293717 A1 | 11/2013 | Zhang et al. |
| 2013/0314503 A1 | 11/2013 | Nix et al. |
| 2014/0176716 A1 | 6/2014 | Wallat et al. |

\* cited by examiner

VEHICLE VISION SYSTEM WITH ROAD LINE SENSING ALGORITHM AND LANE DEPARTURE WARNING

CROSS REFERENCE TO RELATED APPLICATION

The present application claims the filing benefits of U.S. provisional application Ser. No. 62/158,837, filed May 8, 2015, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties. Recently, several applications of computer vision techniques have become available in the automotive industry in the form of driver assistance safety features, or even as components of autonomous navigation systems in vehicles. Some vehicles include a feature called lane departure warning (LDW), which is meant to alert the driver of any potential unintended lane change during the course of a trip.

SUMMARY OF THE INVENTION

The present invention provides a vision system or imaging system or lane departure warning system for a vehicle that utilizes one or more cameras (preferably one or more CMOS cameras) to capture image data representative of images exterior of the vehicle, and provides a lane departure warning or alert responsive to image processing of image data captured by a downward viewing camera at the front, rear or sides of the vehicle. For example, the system may process image data captured by a rear camera having a principal axis of its field of view directed generally rearward and downward at the rear of the vehicle. The system uses a wide angle fish-eye camera at the rear or around the vehicle and synthesizes the distorted raw captured image data to create a reduced distortion bird's-eye view of the region by the vehicle for processing and determining lane markings. The synthesized imaged data of the bird's-eye view image is then used for extracting lane markings via classification and image processing techniques. A lane departure system uses such image processing to determine when the vehicle is departing from its traveled lane, whereby an alert may be generated to alert the driver of the vehicle of the lane departure.

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide a top down or bird's eye or surround view display and may provide a displayed image that is representative of the subject vehicle, and optionally with the displayed image being customized to at least partially correspond to the actual subject vehicle.

Figure 1:
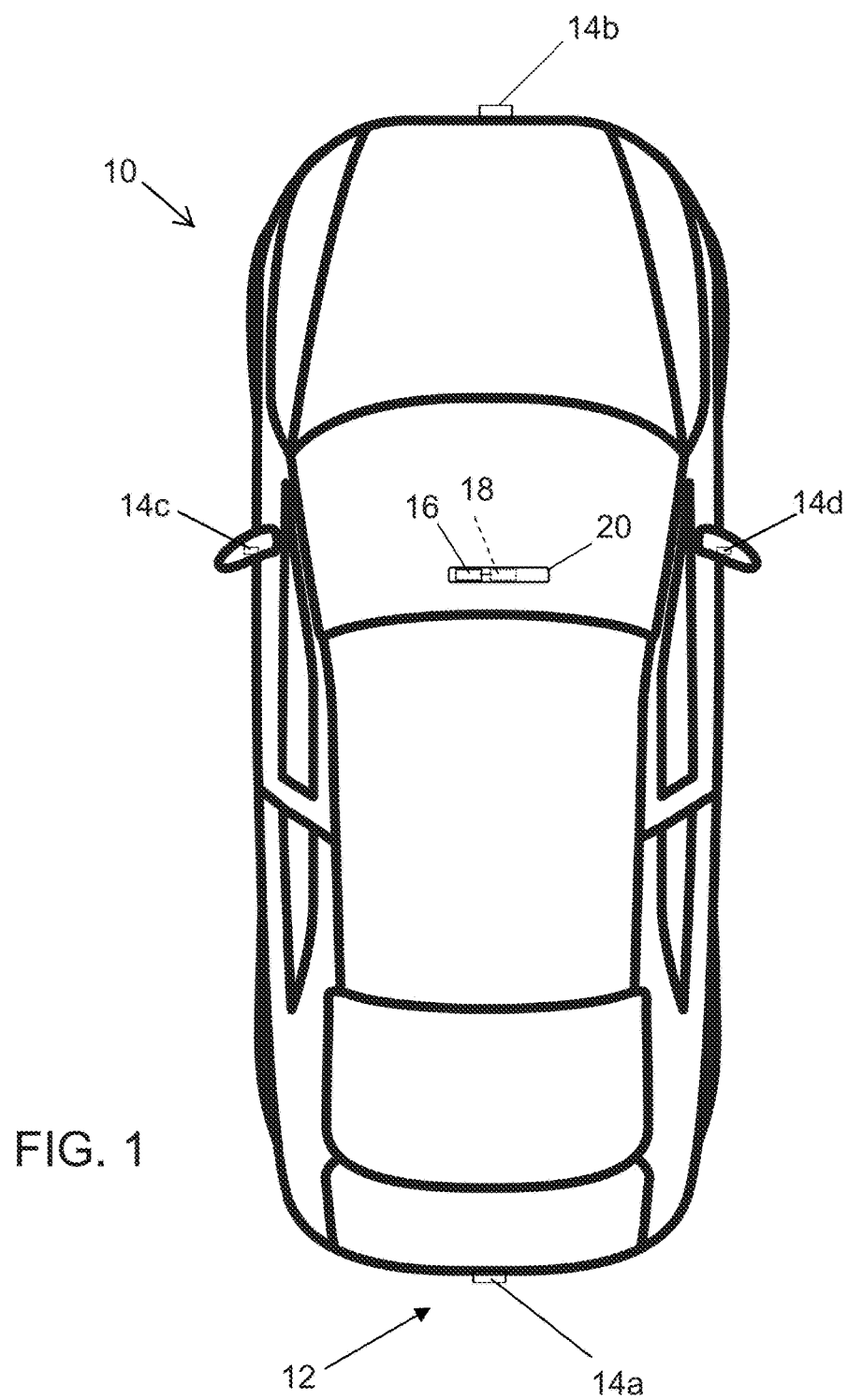
FIG. 1 is a plan view of a vehicle with a vision system that incorporates cameras in accordance with the present invention.

Referring now to the drawings and the illustrative embodiments depicted therein, a vehicle 10 includes an imaging system or vision system 12 that includes at least one exterior facing imaging sensor or camera, such as a rearward facing imaging sensor or camera 14a (and the system may optionally include multiple exterior facing imaging sensors or cameras, such as a forwardly facing camera 14b at the front (or at the windshield) of the vehicle, and a sidewardly/rearwardly facing camera 14c, 14d at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) or processor 18 that is operable to process image data captured by the camera or cameras and may detect objects or the like and/or provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

The present invention provides a computer vision-based road line sensing algorithm that can be used as a building block for a number of applications, such as lane departure warning, line keeping, and autonomous navigation. The road line sensing algorithm analyzes input video image data of the road to recognize and extract the imaged road lines, so they can be used by different applications such as a lane departure warning (LDW) system. The system processes the synthesized image data that is synthesized to have reduced distortion in displayed images derived from the synthesized image data, such as for displaying reduced distortion bird's-eye images of the region surrounding or partially surrounding the vehicle.

The road line sensing algorithm of the present invention has a number of advantages:

Image rectification. The system operates on a synthetic virtual top view of the road (as opposed to on the default camera view). This greatly simplifies the detection of lines because the line's width may be approximately constant, and the geometry of the road is generally undistorted.

Sensitivity. The algorithm works reasonably well even under some bad road and weather conditions, such as rain, ice/dirty roads, roads with cracks/holes, poor marking, night (with public illumination), and shadows on the road.

Accuracy and robustness. The algorithm of the present invention produces very competitive results in terms of accuracy.

Architectural versatility and real-time processing. The algorithm may be designed and implemented in a modular way so it can be readily used in different vehicles and/or applications. The algorithm can be used on highways and city roads and can be used with multiple cameras simultaneously.

The road line sensing algorithm of the present invention provides enhanced performance and robustness:

Image correction. The algorithm operates on a synthetic virtual top view of the road (as opposed to on the default camera view). This greatly simplifies the detection of lines because the line's width may be approximately constant, and the geometry of the road is generally undistorted.

Pixel classifier. The algorithm uses a robust well-formulated probabilistic approach to classify the pixels that belong to imaged road lines with a very high sensitivity, which makes it reasonably robust in bad road and weather scenarios or conditions, such as night (with public illumination), rain, dirty/icy roads, and roads with cracks, poor line markings, and shadows on the road.

Road geometry enforcement. The algorithm makes use of geometric road constraints to emphasize the detection of valid road lines (for example, the algorithm may compare determined lines to known lane marker widths and known gaps between markers to enhance identification or determination that the lines in the images are lane markers).

Stabilizing stage. The algorithm employs a recursive temporal stabilization mechanism that minimizes jitter of the detected lines and allows for a principled way of predicting road lines when they disappear from the image.

Figure 2:
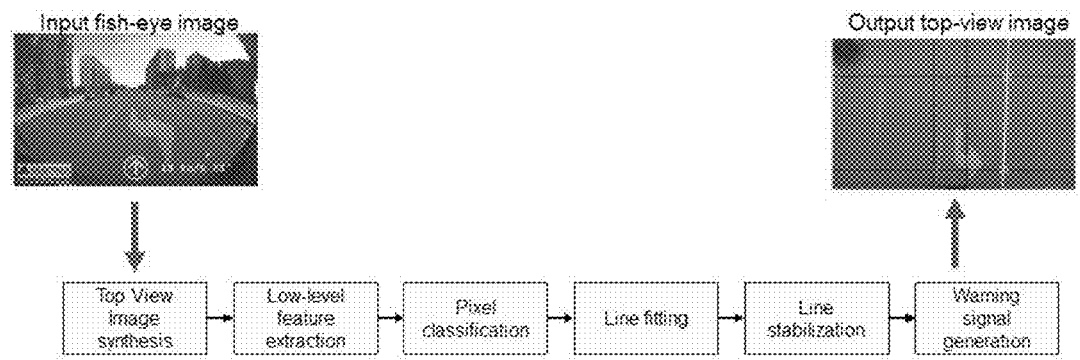
FIG. 2 is block diagram of the image processing and alert generating of the system of the present invention.

FIG. 2 shows a simplified diagram that depicts the stages of the presented road line sensing algorithm for a lane departure warning application. The main stages are (a) a top view image synthesis from the captured fish-eye image (a corrected top view image of the road is synthesized), (b) low level image features extraction, (c) line extraction (Pixel classification and line fitting), and (d) Line stabilization.

As shown in FIG. 2, the top-view image synthesis stage applies lens distortion correction to the input fish-eye image to produce a virtual top view of the road (the image at the right side of FIG. 2) by means of a virtual camera. The low-level feature extraction module uses the top-view image to compute low-level features, such as image gradients and pixel-level statistics, which are sent to the probabilistic pixel classification stage in order to classify each pixel as being or not part of a road line. The detected road line pixels are then used to perform spatial line fitting in order to find lines in the image and to apply road geometry constraints, and perform further analysis, such as line width estimation and gaps detection along the lines. The detected lines are then temporally-stabilized to reduce line jitter from frame to frame. The LDW warning signal is then generated when any of the filtered lines starts entering a programmable warning region (in other words, when the filtered lines start encroaching on the black lines in the right side image of FIG. 2). In the illustrated embodiment, the warning signal is represented as a red line in the image. However, the system may also or otherwise generate an audible signal with different frequencies according to the side of the vehicle where the departure has been detected (such as a first tone or signal when the vehicle is moving from left-to-right, and a second tone or signal when the vehicle is moving from right-to-left).

Figure 3:
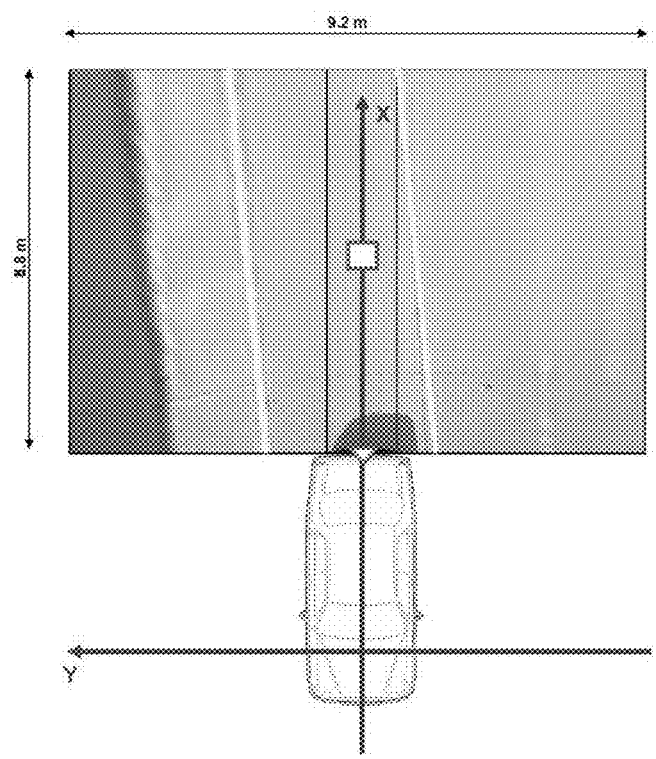
FIG. 3 is a schematic showing the lane departure warning camera set up for the system of the present invention.

The algorithm of the present invention may operate responsive to image data captured by a single rearward viewing fish-eye (or other wide angle lens or wide angle field of view) camera where the camera is looking downward such that the principal axis of its field of view is rearward and downward at an angle of around 45 degrees (such as at least about 30 degrees downward from horizontal, or such as at least about 45 degrees downward from horizontal or the like), and imaging a road area of about 10×10 meters, such as shown in FIG. 3. Although it may be difficult to identify an instance of the algorithm with nearly 100 percent confidence, the following information may be used to identify the algorithm:

Debug diagrams and or image line overlays such as shown in FIGS. 2 and 3.

The algorithm may detect lines in the imaged area of interested, although the actual road lines are curved. That behavior could be used to identify the algorithm.

The algorithm is very sensitive and detects road lines that have relatively low contrast (paint v/s paving colors). Sensitivities between algorithms could be used for comparison purposes. For example, to detect road lines with different contrast levels.

The algorithm also estimates/computes the width of the lines and a continuity measure that is used to determine if a line is dashed or continuous.

The algorithm is able to perform reasonably well using (480×720 and 400×640) grayscale images (no color). This fact could be useful while comparing algorithms with such grayscale images.

Typically, known LDW solutions are based on non-fish-eye cameras with a narrow field of view and relatively large focal lengths (such as using a forward viewing camera disposed at and behind a windshield of the vehicle and viewing forwardly through the windshield and ahead of the vehicle). The proposed algorithm is designed to operate primarily using image data captured by a rearward fish-eye camera looking downward at an angle of about 45 degrees at the rear of the vehicle. The algorithm of the present invention is very sensitive and is able to find stable road lines under different illumination scenarios, and with shadows on the road.

Therefore, the present invention provides a lane detection algorithm that processes image data captured by a rearward and downward viewing camera at the rear of a vehicle. The image data is processed to provide a generally downward view of the road immediately rearward of the vehicle and determines the lane markers at the road and determines when there is a shift of the vehicle's location relative to the determined lane markers. The system may generate an alert (such as a visual or audible alert) to the driver of the vehicle responsive to a determination that the subject vehicle is moving out of the lane in which it is traveling (particularly when no turn signal indicator has been actuated by the driver).

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an EyeQ2 or EyeQ3 image processing chip available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or International Publication Nos. WO 2011/028686; WO 2010/099416; WO 2012/061567; WO 2012/068331; WO 2012/075250; WO 2012/103193; WO 2012/0116043; WO 2012/0145313; WO 2012/0145501; WO 2012/145818; WO 2012/145822; WO 2012/158167; WO 2012/075250; WO 2012/0116043; WO 2012/0145501; WO 2012/154919; WO 2013/019707; WO 2013/016409; WO 2013/019795; WO 2013/067083; WO 2013/070539; WO 2013/043661; WO 2013/048994; WO 2013/063014, WO 2013/081984; WO 2013/081985; WO 2013/074604; WO 2013/086249; WO 2013/103548; WO 2013/109869; WO 2013/123161; WO 2013/126715; WO 2013/043661; WO 2013/158592 and/or WO 2014/204794, which are all hereby incorporated herein by reference in their entireties. The system may communicate with other communication systems via any suitable means, such as by utilizing aspects of the systems described in International Publication Nos. WO/2010/144900; WO 2013/043661 and/or WO 2013/081985, and/or U.S. Publication No. US-2012-0062743, which are hereby incorporated herein by reference in their entireties.

The imaging device and control and image processor and any associated illumination source, if applicable, may comprise any suitable components, and may utilize aspects of the cameras (such as various imaging sensors or imaging array sensors or cameras or the like, such as a CMOS imaging array sensor, a CCD sensor or other sensors or the like) and vision systems described in U.S. Pat. Nos. 5,760,962; 5,715,093; 6,922,292; 6,757,109; 6,717,610; 6,590,719; 6,201,642; 5,796,094; 6,559,435; 6,831,261; 6,822,563; 6,946,978; 7,720,580; 8,542,451; 7,965,336; 7,480,149; 5,550,677; 5,877,897; 6,498,620; 5,670,935; 5,796,094; 6,396,397; 6,806,452; 6,690,268; 7,005,974; 7,937,667; 7,123,168; 7,004,606; 6,946,978; 7,038,577; 6,353,392; 6,320,176; 6,313,454 and/or 6,824,281, and/or International Publication Nos. WO 2009/036176; WO 2009/046268; WO 2010/099416; WO 2011/028686 and/or WO 2013/016409, and/or U.S. Pat. Publication Nos. US 2010-0020170 and/or US-2009-0244361, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149 and/or 7,526,103, which are all hereby incorporated herein by reference in their entireties, a rain sensor, such as the types disclosed in commonly assigned U.S. Pat. Nos. 6,353,392; 6,313,454; 6,320,176 and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978 and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,881,496; 7,720,580; 7,038,577; 5,929,786 and/or 5,786,772, which are hereby incorporated herein by reference in their entireties, a video device for internal cabin surveillance and/or video telephone function, such as disclosed in U.S. Pat. Nos. 5,760,962; 5,877,897; 6,690,268 and/or 7,370,983, and/or U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. No. 6,690,268 and/or U.S. Publication No. US-2012-0162427, which are hereby incorporated herein by reference in their entireties. The video mirror display may comprise any suitable devices and systems and optionally may utilize aspects of the compass display systems described in U.S. Pat. Nos. 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or European patent application, published Oct. 11, 2000 under Publication No. EP 0 1043566, and/or U.S. Publication No. US-2006-0061008, which are all hereby incorporated herein by reference in their entireties. Optionally, the video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in International Publication No. WO 2012/051500, which is hereby incorporated herein by reference in its entirety).

Optionally, the vision system (utilizing the forward facing camera and a rearward facing camera and other cameras disposed at the vehicle with exterior fields of view) may be part of or may provide a display of a top-down view or bird's-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Publication No. US-2012-0162427, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A surround view vision system for a vehicle, said surround view vision system comprising:
   a plurality of cameras disposed at a vehicle each having a respective field of view exterior of the vehicle that encompasses a respective ground region adjacent to the vehicle, said plurality of cameras comprising at least (i) a front camera disposed at a front portion of the vehicle and having at least a forward and downward field of view encompassing a ground region forward of the vehicle and (ii) a rear camera disposed at a rear portion of the vehicle and having at least a rearward and downward field of view encompassing a ground region rearward of the vehicle;
   wherein each of said cameras comprises a lens and a pixelated imaging array having a plurality of photosensing elements;
   an image processor operable to process image data captured by at least some of said cameras;
   wherein said image processor is operable, responsive to image processing of captured image data, to synthesize captured image data to generate a reduced distortion bird's-eye view image of a region exterior and near the vehicle and encompassed by the fields of view of said cameras;
   a display that displays the bird's-eye view image for viewing by a driver of the vehicle while operating the vehicle;
   wherein said image processor processes synthesized captured image data using a lane marker sensing algorithm to determine lane markings in the field of view of at least said rear camera;
   wherein said image processor determines lane markers by (a) extracting low level image features from synthesized captured image data and (b) extracting line information from synthesized captured image data via pixel classification and line fitting;
   wherein said lane marker sensing algorithm utilizes recursive temporal stabilization;
   wherein said lane marker sensing algorithm predicts lane markers when they are no longer within the field of view of said rear camera;
   wherein prediction of lane markers when they are no longer within the field of view of said rear camera is based at least in part on said recursive temporal stabilization; and
   wherein said system, responsive to processing of synthesized captured image data using said lane marker sensing algorithm, determines when the vehicle is departing from its being-traveled lane and, responsive to a determination that the vehicle is departing from its being-traveled lane, generates an alert to the driver of the vehicle.

2. The surround view vision system of claim 1, wherein said image processor processes synthesized captured image data and determines lane markings via classification and image processing techniques.

3. The surround view vision system of claim 1, wherein a principal axis of the field of view of said rear camera is downward at an angle of about 45 degrees.

4. The surround view vision system of claim 1, wherein said lens comprises a fish-eye lens.

5. The surround view vision system of claim 1, wherein said image processor determines lane markers by stabilizing line information extracted from synthesized captured image data.

6. The surround view vision system of claim 1, wherein said lane marker sensing algorithm utilizes said recursive temporal stabilization to reduce jitter of detected lines in synthesized captured image data.

7. The surround view vision system of claim 1, wherein said lane marker sensing algorithm utilizes geometric road constraints to enhance determination of lane markers.

8. The surround view vision system of claim 1, wherein said lane marker sensing algorithm utilizes synthesized captured image data to determine low-level features including image gradients and pixel-level statistics, and wherein said lane marker sensing algorithm utilizes a probabilistic pixel classification stage to classify data captured by each pixel of said rear camera as being part of a lane marker or not part of a lane marker.

9. The surround view vision system of claim 8, wherein said lane marker sensing algorithm applies spatial line fitting to pixels that are determined to be part of a lane marker to determine lines in synthesized captured image data.

10. The surround view vision system of claim 9, wherein said lane marker sensing algorithm applies road geometric constraints including lane marker width and gap size between lane markers.

11. The surround view vision system of claim 1, wherein said alert comprises a visible alert generated in the displayed bird's-eye view image.

12. The surround view vision system of claim 11, wherein said visible alert comprises a linear overlay that shows deviation of the vehicle's path of travel relative to the lane markers displayed in the displayed bird's-eye view image.

13. A surround view vision system for a vehicle, said surround view vision system comprising:
   a plurality of cameras disposed at a vehicle each having a respective field of view exterior of the vehicle that encompasses a respective ground region adjacent to the vehicle, said plurality of cameras comprising at least (i) a rear camera disposed at a rear portion of the vehicle and having at least a rearward and downward field of view encompassing a ground region rearward of the vehicle, (ii) a driver side camera disposed at a driver-side portion of the vehicle and having at least a sideward and downward field of view encompassing a ground region sideward of the vehicle and (iii) a passenger side camera disposed at a passenger-side portion of the vehicle and having at least a sideward and downward field of view encompassing a ground region sideward of the vehicle;
   wherein each of said cameras comprises a fish-eye lens and a pixelated imaging array having a plurality of photosensing elements;
   an image processor operable to process image data captured by at least some of said cameras;
   wherein said image processor is operable, responsive to image processing of captured image data, to synthesize captured image data to generate a reduced distortion bird's-eye view image of a region exterior and near the vehicle and encompassed by the fields of view of said cameras;
   a display that displays the bird's-eye view image for viewing by a driver of the vehicle while operating the vehicle;
   wherein said image processor processes synthesized captured image data using a lane marker sensing algorithm to determine lane markings in the field of view of at least said rear camera;
   wherein said image processor determines lane markers by (a) extracting low level image features from synthesized captured image data and (b) extracting line information from synthesized captured image data via pixel classification and line fitting;
   wherein said lane marker sensing algorithm utilizes recursive temporal stabilization;
   wherein said lane marker sensing algorithm predicts lane markers when they are no longer within the field of view of said rear camera;
   wherein prediction of lane markers when they are no longer within the field of view of said rear camera is based at least in part on said recursive temporal stabilization;
   wherein said system, responsive to processing of synthesized captured image data using said lane marker sensing algorithm, determines when the vehicle is departing from its being-traveled lane and, responsive to a determination that the vehicle is departing from its being-traveled lane, generates an alert to the driver of the vehicle; and
   wherein said alert comprises a visible alert generated in the displayed bird's-eye view image, and wherein said visible alert comprises a linear overlay that shows deviation of the vehicle's path of travel relative to the lane markers displayed in the displayed bird's-eye view image.

14. The surround view vision system of claim 13, wherein said lane marker sensing algorithm utilizes said recursive temporal stabilization to reduce jitter of detected lines in synthesized captured image data.

15. A surround view vision system for a vehicle, said surround view vision system comprising:
   a plurality of cameras disposed at a vehicle each having a respective field of view exterior of the vehicle that encompasses a respective ground region adjacent to the vehicle, said plurality of cameras comprising at least (i) a rear camera disposed at a rear portion of the vehicle and having at least a rearward and downward field of view encompassing a ground region rearward of the vehicle, (ii) a driver side camera disposed at a driver-side portion of the vehicle and having at least a sideward and downward field of view encompassing a ground region sideward of the vehicle, (iii) a passenger side camera disposed at a passenger-side portion of the vehicle and having at least a sideward and downward field of view encompassing a ground region sideward of the vehicle, and (iv) a front camera disposed at a front portion of the vehicle and having at least a forward and downward field of view encompassing a ground region forward of the vehicle;
   wherein each of said cameras comprises a fish-eye lens and a pixelated imaging array having a plurality of photosensing elements;
   an image processor operable to process image data captured by at least some of said cameras;
   wherein said image processor is operable, responsive to image processing of captured image data, to synthesize captured image data to generate a reduced distortion bird's-eye view image of a region exterior and near the vehicle and encompassed by the fields of view of said cameras;
   a display that displays the bird's-eye view image for viewing by a driver of the vehicle while operating the vehicle;
   wherein said image processor processes synthesized captured image data using a lane marker sensing algorithm to determine lane markings in the field of view of at least said rear camera;
   wherein said image processor determines lane markers by (a) extracting low level image features from synthesized captured image data and (b) extracting line information from synthesized captured image data via pixel classification and line fitting;

wherein said lane marker sensing algorithm utilizes recursive temporal stabilization;

wherein said lane marker sensing algorithm utilizes said recursive temporal stabilization to reduce jitter of detected lines in synthesized captured image data;

wherein said lane marker sensing algorithm predicts lane markers when they are no longer within the field of view of said rear camera;

wherein prediction of lane markers when they are no longer within the field of view of said rear camera is based at least in part on said recursive temporal stabilization;

wherein said system, responsive to processing of synthesized captured image data using said lane marker sensing algorithm, determines when the vehicle is departing from its being-traveled lane and, responsive to a determination that the vehicle is departing from its being-traveled lane, generates an alert to the driver of the vehicle;

wherein said alert comprises a visible alert generated in the displayed bird's-eye view image, and wherein said visible alert comprises a linear overlay that shows deviation of the vehicle's path of travel relative to the lane markers displayed in the displayed bird's-eye view image; and wherein said alert further comprises an audible alert in the vehicle.

16. The surround view vision system of claim 15, wherein said lane marker sensing algorithm utilizes geometric road constraints to enhance determination of lane markers, and wherein the utilized road geometric constraints include lane marker width and gap distance between markers.

\* \* \* \* \*